US010690549B2

(12) United States Patent
Koyama et al.

(10) Patent No.: US 10,690,549 B2
(45) Date of Patent: Jun. 23, 2020

(54) TEMPERATURE SENSOR HOLDER

(71) Applicants: JATCO Ltd, Fuji-shi, Shizuoka (JP); NISSAN MOTOR CO., LTD., Yokohama-shi, Kanagawa (JP)

(72) Inventors: Akihiro Koyama, Atsugi (JP); Masaomi Morishita, Odawara (JP); Yasushi Arakawa, Kanagawa (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 278 days.

(21) Appl. No.: 15/576,420

(22) PCT Filed: May 18, 2016

(86) PCT No.: PCT/JP2016/064771
§ 371 (c)(1),
(2) Date: Nov. 22, 2017

(87) PCT Pub. No.: WO2016/190198
PCT Pub. Date: Dec. 1, 2016

(65) Prior Publication Data
US 2018/0156669 A1    Jun. 7, 2018

(30) Foreign Application Priority Data

May 25, 2015   (JP) ................................. 2015-105571

(51) Int. Cl.
G01K 1/14    (2006.01)
H02K 11/25   (2016.01)
G01K 13/08   (2006.01)

(52) U.S. Cl.
CPC ............... *G01K 1/14* (2013.01); *G01K 13/08* (2013.01); *H02K 11/25* (2016.01)

(58) Field of Classification Search
CPC .......... G01K 1/14; G01K 13/08; H02K 11/00; H02K 11/20; H02K 11/25
See application file for complete search history.

(56) References Cited

U.S. PATENT DOCUMENTS

| 4,313,069 A | 1/1982 | Szabo et al. | |
| 2012/0111145 A1* | 5/2012 | Maekawa | H02K 3/522 74/665 A |

(Continued)

FOREIGN PATENT DOCUMENTS

| JP | 2010-252508 A | 11/2010 |
| JP | 2011-254628 A | 12/2011 |

(Continued)

*Primary Examiner* — Lisa M Caputo
*Assistant Examiner* — Philip L Cotey
(74) *Attorney, Agent, or Firm* — Foley & Lardner LLP

(57) ABSTRACT

A mounting structure of a temperature sensor is adapted to mount a temperature sensor adapted to measure a temperature of a coil to a stator constituted by arranging a plurality of sets of a stator core, the coil wound around the stator core, and an insulator ensuring insulation between the stator core and the coil. The mounting structure of a temperature sensor comprises a holder fixing portion fixed to the insulator, and a sensor holding portion formed integrally with the holder fixing portion and holding the temperature sensor on a coil end portion of the coil. In the sensor holding portion, a storage groove adapted to store the temperature sensor is formed, and at a groove bottom of the storage groove, a sensor pressing portion adapted to press the temperature sensor to the coil end portion is formed.

6 Claims, 8 Drawing Sheets

(56) References Cited

U.S. PATENT DOCUMENTS

| | | | |
|---|---|---|---|
| 2012/0112580 A1* | 5/2012 | Sato | H02K 3/522 310/71 |
| 2012/0112581 A1* | 5/2012 | Maekawa | H02K 3/522 310/71 |
| 2014/0191629 A1* | 7/2014 | Takahashi | H02K 3/48 310/68 C |
| 2015/0155760 A1 | 6/2015 | Bessho et al. | |
| 2016/0261175 A1* | 9/2016 | Takamizawa | H02K 11/25 |
| 2018/0017446 A1* | 1/2018 | Yoshihara | G01K 1/14 |

FOREIGN PATENT DOCUMENTS

| | | |
|---|---|---|
| JP | 2013-172478 A | 9/2013 |
| JP | 5726277 B1 | 5/2015 |

\* cited by examiner

TEMPERATURE SENSOR HOLDER

TECHNICAL FIELD

The present invention relates to a mounting structure of a temperature sensor.

BACKGROUND ART

JP2011-254628A discloses a mounting structure of a U-shaped temperature sensor which sandwiches a coil from both sides of the coil and measures a temperature of a coil surface.

SUMMARY OF INVENTION

However, in the mounting structure of the temperature sensor in JP2011-254628A, since the coil is sandwiched from the both sides of the coil, an arrangement space for the coil becomes smaller, which reduces the number of winding of the coil. Thus, a space factor of a coil lowers for the portion of an area where the mounting structure of the temperature sensor is inserted into the both sides of the coil, and driving force performances of a motor cannot be improved.

The present invention has an object to provide a mounting structure of a temperature sensor which can increase a coil space factor by ensuring an arrangement space for the coil and can improve driving force performances of a motor.

According to one aspect of the present invention, a mounting structure of a temperature sensor is adapted to mount a temperature sensor adapted to measure a temperature of a coil to a stator constituted by arranging a plurality of sets of a stator core, the coil wound around the stator core, and an insulator ensuring insulation between the stator core and the coil. The mounting structure of a temperature sensor comprises a holder fixing portion fixed to the insulator, and a sensor holding portion formed integrally with the holder fixing portion and holding the temperature sensor on a coil end portion of the coil. In the sensor holding portion, a storage groove adapted to store the temperature sensor is formed, and at a groove bottom of the storage groove, a sensor pressing portion adapted to press the temperature sensor to the coil end portion is formed.

In the mounting structure of a temperature sensor according to the aforementioned mode, the holder fixing portion is fixed to the insulator, and the sensor pressing portion formed at a the groove bottom of the storage groove presses the temperature sensor to a coil end portion and thus, it is no longer necessary to arrange the temperature sensor or the mounting structure of the temperature sensor in a space where the coil is to be arranged, whereby the arrangement space for the coil can be ensured. As a result, since the number of coil winding increases and the coil space factor rises, the driving force performances of the motor can be improved.

DESCRIPTION OF EMBODIMENTS

An embodiment of the present invention will be described below by referring to the attached drawings and the like.

Figure 1:
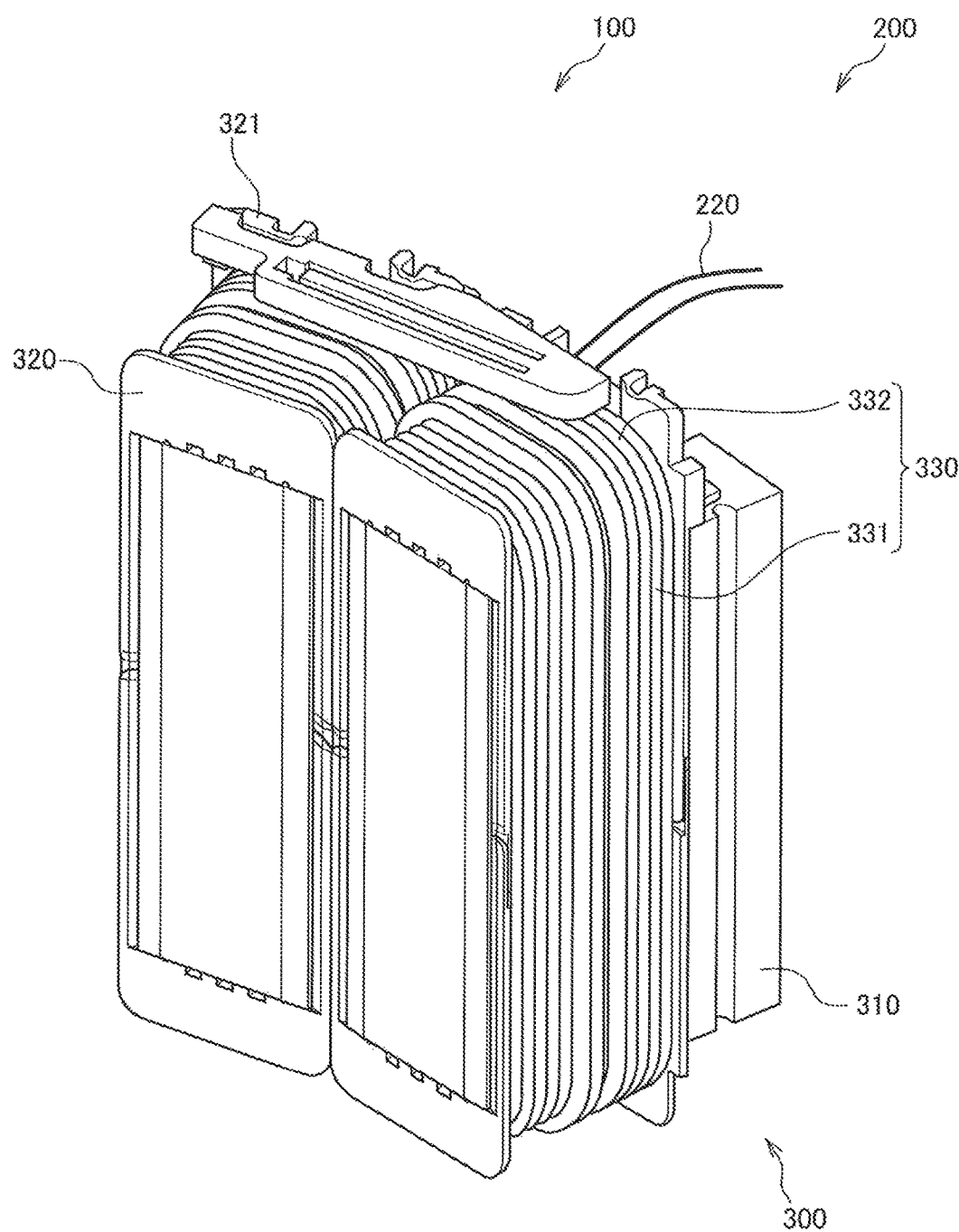
FIG. 1 is a view illustrating a state where a temperature sensor holder and a temperature sensor according to an embodiment of the present invention are incorporated in a stator.

FIG. 1 is a view illustrating a state where a temperature sensor holder 100 and a temperature sensor 200 according to an embodiment of the present invention are incorporated in a stator 300. The temperature sensor holder 100 functions as a mounting structure of the temperature sensor 200 for mounting the temperature sensor 200 to the stator 300.

The stator 300 is a split-core type stator split into a plurality of parts in a stator circumferential direction. The stator 300 includes a stator core 310, a coil 330 wound around the stator core 310, and an insulator 320 ensuring insulation between the stator core 310 and the coil 330. By incorporating a rotor, not shown, rotatably in the stator 300, a motor is constituted.

The stator core 310 is a laminated body made of an electromagnetic steel plate. The stator core 310 is constituted annularly by being connected along the stator circumferential direction.

The insulator 320 is an insulator made of a resin bobbin. The insulator 320 is assembled from both sides in a rotor rotating shaft direction so as to sandwich the stator core 310 and ensures electric insulation between the stator core 310 and the coil 330. The insulator 320 assembled to the stator core 310 has two flanges 321 protruded/formed in the rotor rotating shaft direction.

The coil 330 is an electric wire with an outer periphery covered with an insulating coating material. The coil 330 is wound on the insulator 320 around the stator 310 as illustrated in FIG. 1. The coil 330 is constituted by an inner-slot coil portion 331 arranged in a slot which is a space formed by the adjacent stator core 310 and a coil end portion 332 arranged at a position protruding from the slot.

Figure 2:
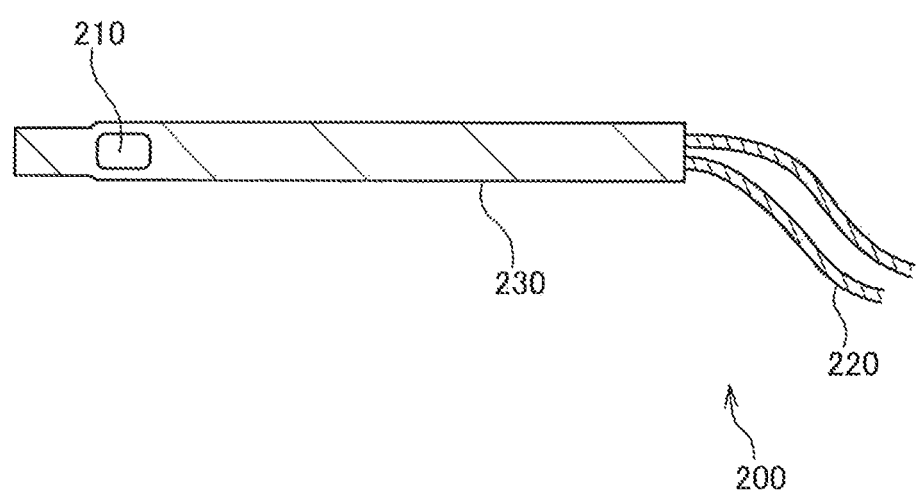
FIG. 2 is a schematic configuration view of the temperature sensor.

FIG. 2 is a schematic configuration view of the temperature sensor 200.

The temperature sensor 200 is constituted by a temperature measuring portion 210 for measuring a temperature of the coil 330, a harness 220 for ensuring an input/output signal and electricity, and a case 230 for accommodating the temperature measuring portion 210 and the like. The temperature sensor 200 is used in a state mounted on the temperature sensor holder 100 which will be described later.

Figure 3:
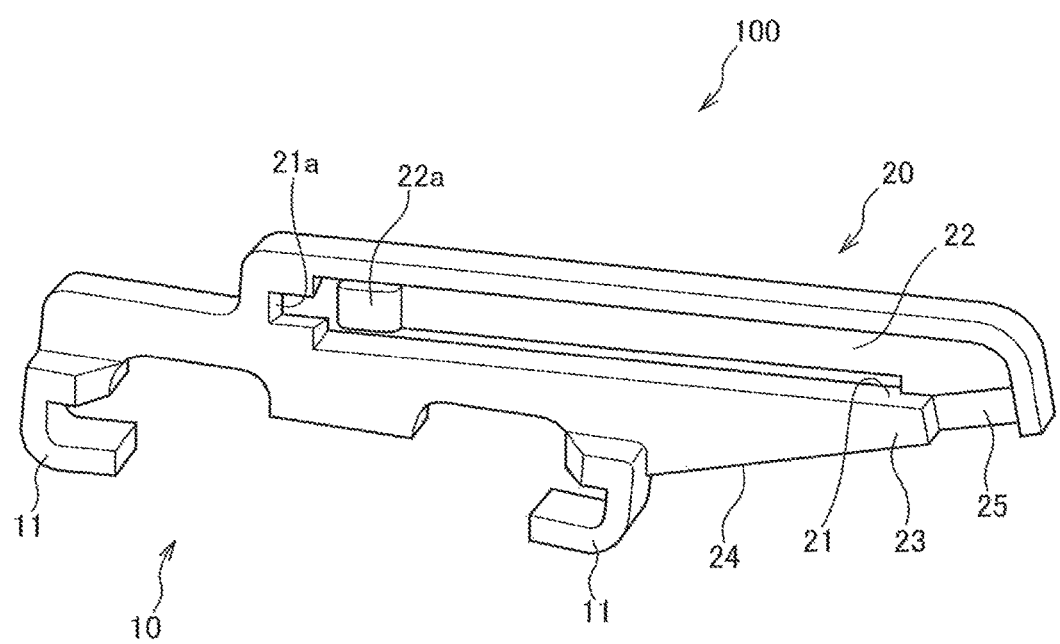
FIG. 3 is a schematic configuration view of the temperature sensor holder according to the embodiment of the present invention.

Subsequently, the temperature sensor holder 100 will be described by referring to FIG. 3. FIG. 3 is a schematic configuration view of the temperature sensor holder 100.

The temperature sensor holder 100 has a holder fixing portion 10 and a sensor holding portion 20 formed integrally with the holder fixing portion 10.

On the holder fixing portion 10, two claws 11 for sandwiching the flange portions 321 of the insulator 320 are provided. The holder fixing portion 10 is, as illustrated in FIGS. 4A and 4B, fixed to the insulators 320 by fitting the claws 11 in the flange portions 321 from the rotor rotating shaft direction.

Figure 4A:
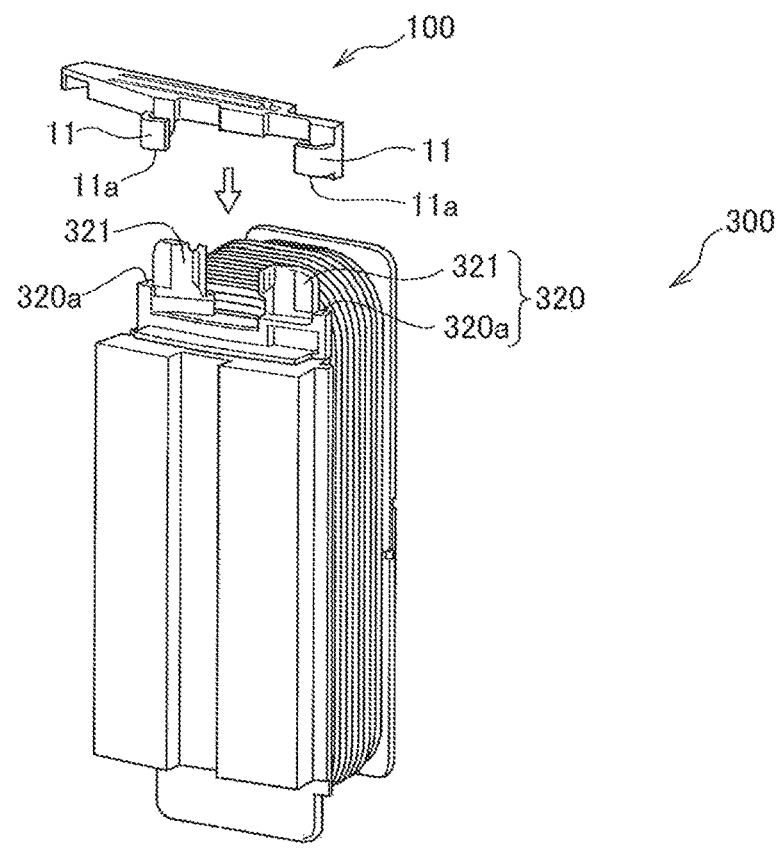
FIG. 4A is a view illustrating a state before the temperature sensor holder is incorporated in the stator.
Figure 4B:
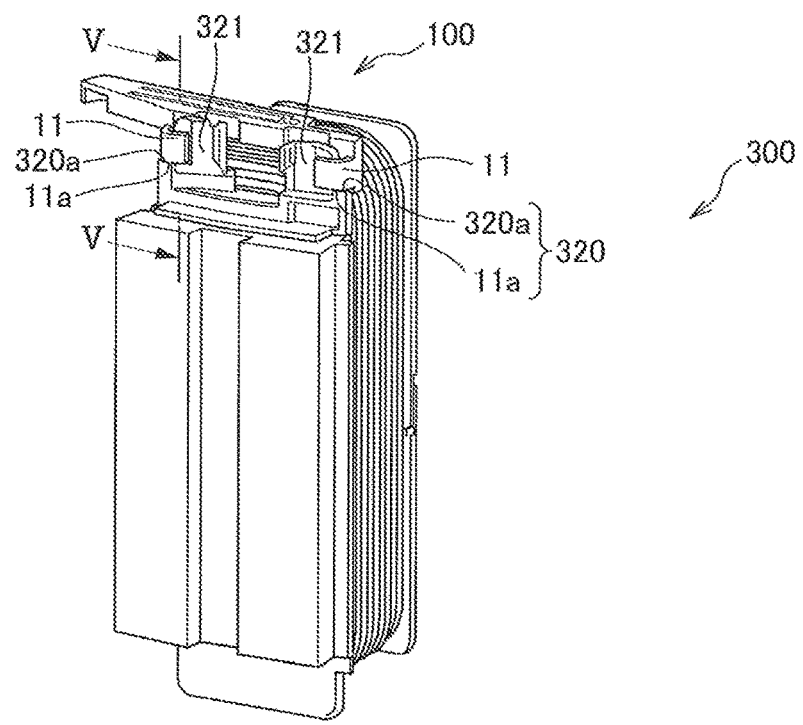
FIG. 4B is a view illustrating a state after the temperature sensor holder is incorporated in the stator.

FIG. 4A is a view illustrating a state before the temperature sensor holder 100 is incorporated in the stator 300, and FIG. 4B is a view illustrating a state after the temperature sensor holder 100 is incorporated in the stator 300.

The temperature sensor holder 100 is, as illustrated in FIG. 4B, positioned in the rotor rotating shaft direction and fixed by bringing end portions 11a of the claws 11 into contact with position fixing surfaces 320a of the insulators 320. By means of presence of the position fixing surface 320a in the insulator 320, the temperature sensor holder 100 does not hit the coil 330 strongly at attachment of the temperature sensor holder 100, and damage on the insulating coating material covering the outer periphery of the coil 330 is prevented. Thus, when the temperature sensor holder 100 is to be assembled to the stator 300, extreme care in assembling is no longer needed, and assembling workability is improved.

Figure 5:
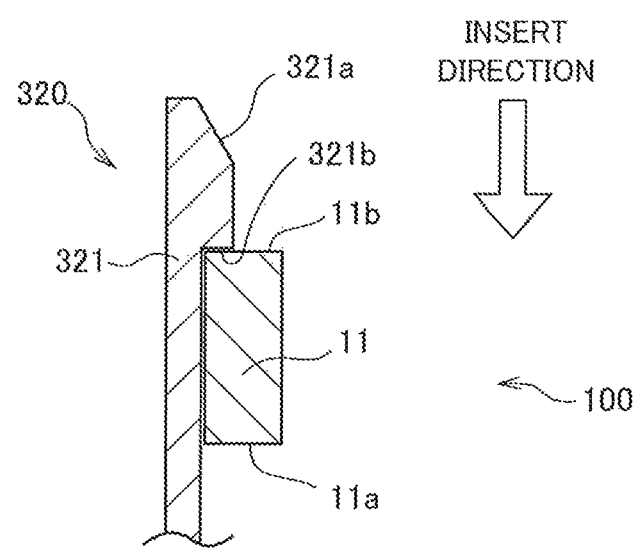
FIG. 5 is a sectional view along V-V line in FIG. 4B and is a local enlarged view of a spot where a claw of the temperature sensor holder is located.

FIG. 5 is a sectional view along V-V line in FIG. 4B and is a local enlarged view of a spot where the claw 11 of the temperature sensor holder 100 is located. As illustrated in FIG. 5, in the flange portion 321 of the insulator 320, a taper 321a and a step 321b on a lower part of the taper 321a are provided.

By means of provision of the taper 321a of the flange portion 321 in the insulator 320, positioning when the claw 11 of the temperature sensor holder 100 is fitted in the flange portion 321 is made easier, and an insertion load is reduced.

Moreover, after the claw 11 of the temperature sensor holder 100 is fitted in the flange portion 321 of the insulator 320, an end portion 11b of the claw 11 is hooked by the step 321b of the flange portion 321. The end portion 11b is an end portion formed on a side opposite to the end portion 11a of the claw 11 in the rotor rotating shaft direction. Thus, since the claw 11 cannot be pulled out easily from the flange portion 321, removal of the temperature sensor holder 100 from the insulator 320 after the assembling of the temperature sensor holder 100 to the stator 300 can be avoided.

Since some gap is present in the rotor rotating shaft direction between the step 321b and the claw 11, the temperature sensor holder 100 can slightly move in the rotor rotating shaft direction, but rough positioning can be made. In the end, the temperature sensor 200 is fixed to the coil 330 by application of vanish, and the position of the temperature sensor holder 100 is not deviated by vibration or the like.

Returning to FIG. 3, the sensor holding portion 20 of the temperature sensor holder 100 will be described. The sensor holding portion 20 has a storage groove 21 and an expanding portion 23.

The storage groove 21 is a groove for storing the temperature sensor 200. On a groove bottom of the storage groove 21, a sensor pressing portion 22 for pressing the temperature sensor 200 toward the coil end portion 332 of the coil 330 is formed.

The sensor pressing portion 22 has a cantilever structure formed so as to extend from one end of the storage groove 21 on the expanding portion 23 side to the other end of the storage groove 21 on the holder fixing portion 10 side. The sensor pressing portion 22 has a projecting portion 22a protruding toward the temperature sensor 200 side at a position on the other end side in the storage groove 21.

Figure 6:
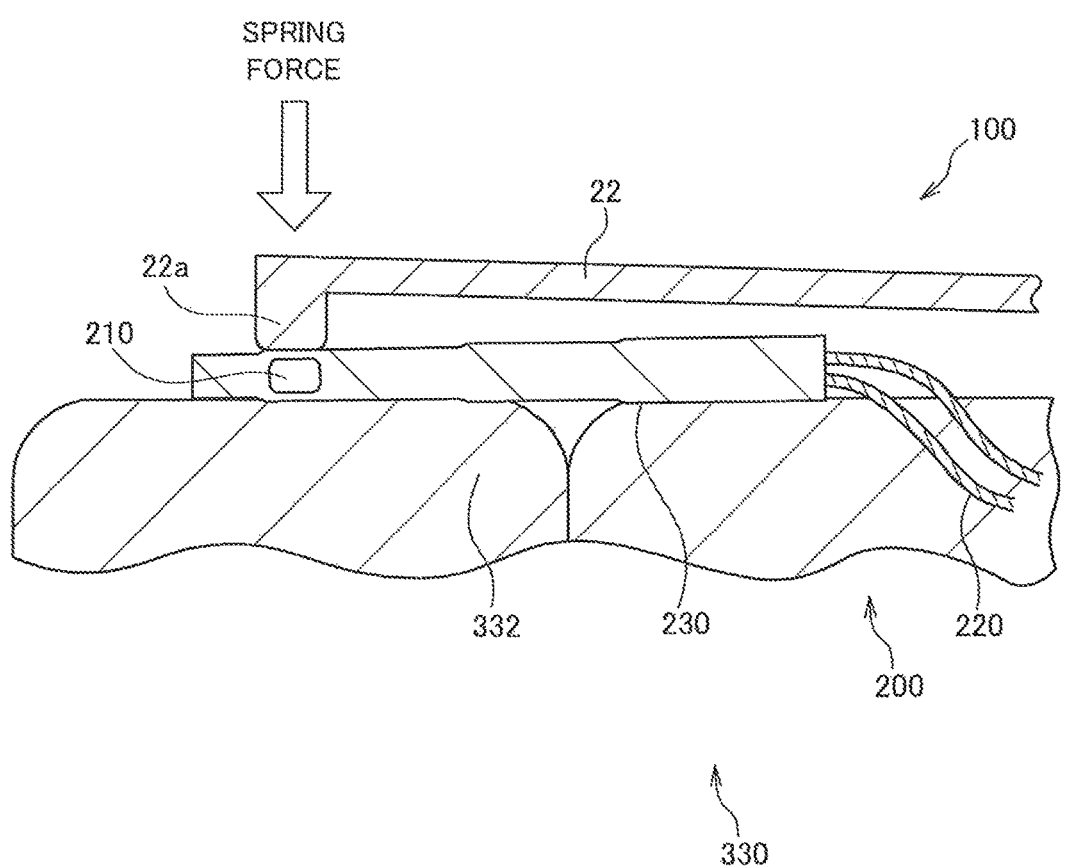
FIG. 6 is a schematic configuration view when the temperature sensor is installed at a coil end portion.

FIG. 6 is a schematic configuration view in an enlarged manner of the sensor pressing portion 22 of the temperature sensor holder 100 in a state pressing the temperature sensor 200 to the coil end portion 332.

The sensor pressing portion 22, as illustrated in FIG. 6, holds the temperature measuring portion 210 of the temperature sensor 200 by pressing it to the coil end portion 332 by the projecting portion 22a formed on the other end side in the storage groove 21. As described above, since the sensor pressing portion 22 has a cantilever structure, a spring force for pressing the temperature measuring portion 210 of the temperature sensor 200 to the coil end portion 332 acts on the projecting portion 22a. The temperature measuring portion 210 measures the temperature on an uppermost surface of the coil 330 by being pressed by the projecting portion 22a and brought into contact with the coil end portion 332. Information of the temperature detected by the temperature measuring portion 210 is output to an external control device, not shown, through the harness 220.

On the other hand, repulsion of the spring force in the rotor rotating shaft direction and in a direction away from the coil end portion 332 acts on the holder fixing portion 10 of the temperature sensor holder 100. That is, on the claw 11 of the temperature sensor holder 100, the repulsion of the spring force acts in the direction of pulling out of the flange portion 321 of the insulator 320. However, as illustrated in FIG. 5, since the end portion 11b of the claw 11 is hooked by the step 321b of the flange portion 321, the temperature sensor holder 100 does not come out of the insulator 320 but has its position fixed.

Figure 7:
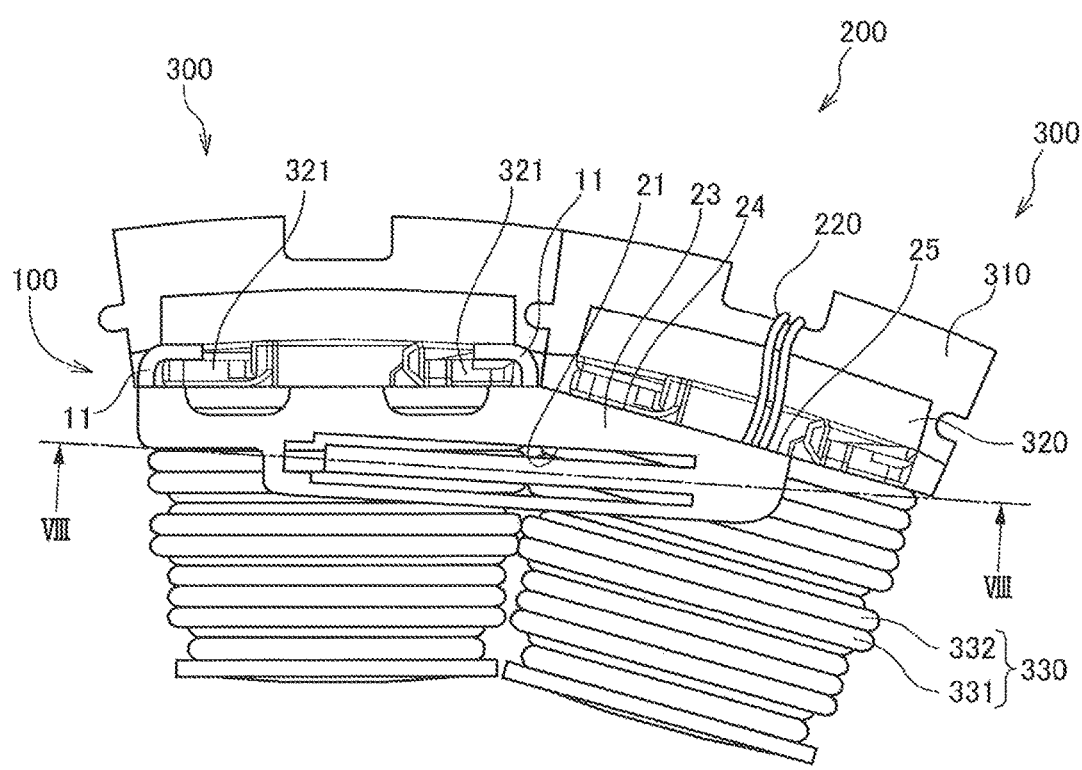
FIG. 7 is a view of the stator incorporating the temperature sensor holder and the temperature sensor when seen from one side of a rotor rotating shaft.

FIG. 7 is a view of the stator 300 incorporating the temperature sensor holder 100 and the temperature sensor 200 when seen from one side of the rotor rotating shaft.

The expanding portion 23 has a structure, as illustrated in FIG. 7, formed by protruding from the holder fixing portion 10 in the stator circumferential direction and expanding over the coil end portion 332 of the coil 330 arranged adjacently. A part of the storage groove 21 is formed in the expanding portion 23. In the expanding portion 23, an escape portion 24 and an opening portion 25 are formed on the claw 11 side of the holder fixing portion 10.

The escape portion 24 is formed so as to extend along the flange portion 321 of the insulator 320 arranged adjacently to the insulator 320 on which the temperature sensor holder 100 is installed. In the temperature sensor holder 100, since the expanding portion 23 has the escape portion 24, the expanding portion 23 and the flange portion 321 of the adjacently arranged insulator 320 can be arranged without interference on the coil end portion 332 of the coil 330.

The opening portion 25 is an opening through which the harness 220 of the temperature sensor 200 is to be taken out from above the insulator 320 arranged adjacently to the insulator 320 on which the temperature sensor holder 100 is installed. The opening portion 25 is formed so as to be located between the two flange portions 321 of the adjacently arranged insulator 320 when the temperature sensor holder 100 is arranged on the coil end portion 332 of the coil 330.

Figure 8:
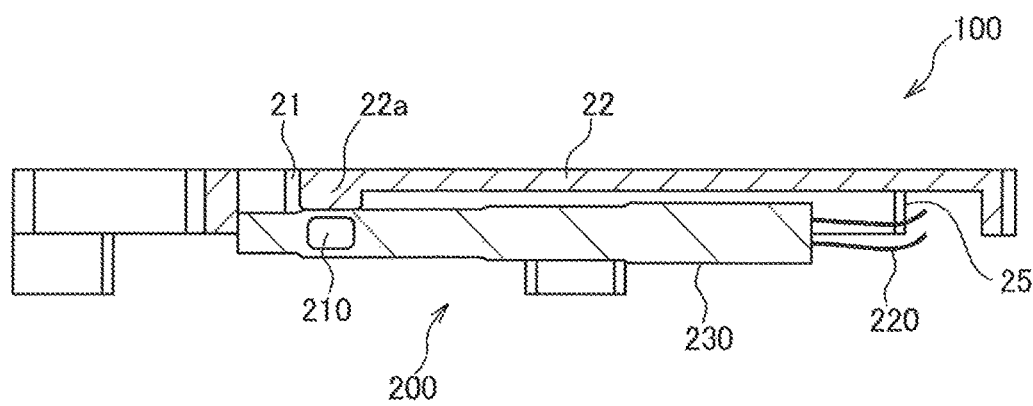
FIG. 8 is a sectional view along VIII-VIII line in FIG. 7 and a schematic configuration view of the temperature sensor holder when the temperature sensor is stored therein.

FIG. 8 is a sectional view along VIII-VIII line in FIG. 7 and is a schematic configuration view of the temperature sensor holder 100 when the temperature sensor 200 is stored.

In the temperature sensor holder 100, as illustrated in FIG. 8, the temperature sensor 200 is inserted into the storage groove 21. Since the temperature sensor holder 100 is brought into contact with the coil 330 whose temperature rises, it is preferably constituted by a highly heat-resistant resin or the like.

A distal end of the case 230 of the temperature sensor 200 is positioned at a distal-end receiving portion 21a of the storage groove 21 when the temperature sensor 200 is inserted into the storage groove 21 of the temperature sensor holder 100. Here, the distal end of the case 230 means at least a portion farther away from the harness 220 than the temperature measuring portion 210. The case 230 is formed with steps such that its diameter is made smaller in steps as it goes toward the distal end. Since the temperature measuring portion 210 or the harness 220 is not present at the distal end of the case 230, the distal end of the case 230 has a diameter smaller than the other portions. The distal-end receiving portion 21a of the storage groove 21 is formed having a dent shape into which the distal end of the case 230 can be inserted. Thus, by inserting the distal end of the case 230 into the distal-end receiving portion 21a of the storage groove 21, the temperature sensor 200 can be positioned with accuracy. Moreover, since the projecting portion 22a pressing the temperature sensor 200 is protruded/formed on the sensor pressing portion 22 of the temperature sensor holder 100, even if the case 230 is formed with steps, the projecting portion 22a is brought into contact with the temperature measuring portion 210 of the temperature sensor 200. The case 230 may be formed having a taper shape in which the diameter gradually decreases as it goes toward the distal end.

According to the temperature sensor holder 100 which is the mounting structure of the temperature sensor according to the aforementioned embodiment, the following effects can be obtained.

The temperature sensor holder 100 is the mounting structure of the temperature sensor for mounting the temperature sensor 200 for measuring a temperature of the coil 330 on the stator 300 constituted by arranging a plurality of sets of the stator core 310, the coil 330 wound around the stator core 310, and the insulator 320 ensuring insulation between the stator core 310 and the coil 330. The temperature sensor holder 100 has the holder fixing portion 10 fixed to the insulator 320 and the sensor holding portion 20 integrally formed with the holder fixing portion 10 and holding the temperature sensor 200 on the coil end portion 332 of the coil 330. In the sensor holding portion 20, the storage groove 21 for storing the temperature sensor 200 is formed, and the sensor pressing portion 22 for pressing the temperature sensor 200 to the coil end portion 332 is formed on the groove bottom of the storage groove 21.

According to the temperature sensor holder 100, since the holder fixing portion 10 is fixed to the insulator 320, and the sensor pressing portion 22 formed on the groove bottom of the storage groove 21 presses the temperature sensor 200 to the coil end portion 332, it is no longer necessary to arrange the temperature sensor 200 or the temperature sensor holder 100 in the space where the coil 330 is arranged, and the arrangement space for the coil 330 can be ensured. As a result, it is no longer necessary to reduce the number of coil winding for the volume of the temperature sensor 200 or the temperature sensor holder 100, the number of coil winding increases and the coil space factor rises, and the driving force performances of the motor can be improved.

In the temperature sensor holder 100, the sensor pressing portion 22 has a cantilever structure formed so as to extend from one end to the other end of the storage groove 21 and presses the temperature sensor 200 on the other end side in the storage groove 21.

According to the temperature sensor holder 100, since the sensor pressing portion 22 has a cantilever structure, the spring force for pressing the temperature sensor 200 is generated. Moreover, in the temperature sensor holder 100, since the holder fixing portion 10 is fixed to the insulator 320, even if repulsion of the spring force is received, a relative position with respect to the insulator 320 is not changed. Therefore, the temperature sensor holder 100 can continuously press the temperature sensor 200 to the coil end portion 332 without lowering the spring force.

In the temperature sensor holder 100, the sensor pressing portion 22 has the projecting portion 22a protruding toward the temperature sensor 200 side at the position on the other end side in the storage groove 21.

According to the temperature sensor holder 100, even if the case 230 of the temperature sensor 200 is formed having steps or a taper shape, the temperature measuring portion 210 of the temperature sensor 200 can be pressed by the projecting portion 22a of the sensor pressing portion 22, and the temperature measuring portion 210 can be reliably pressed onto the coil end portion 332 of the coil 330.

In the temperature sensor holder 100, the sensor holding portion 20 has the expanding portion 23 formed by protruding from the holder fixing portion 10 in the stator circumferential direction.

According to the temperature sensor holder 100, by means of presence of the expanding portion 23, a length of the sensor pressing portion 22 can be made longer and thus, a stress concentrated on the sensor pressing portion 22 can be made smaller.

In the temperature sensor holder 100, the expanding portion 23 has the escape portion 24 for avoiding interference with the adjacently arranged insulator 320.

According to the temperature sensor holder 100, since the length of the sensor pressing portion 22 can be made longer so as to extend along the adjacently arranged insulator 320, the stress concentrated on the sensor pressing portion 22 can be made smaller.

The temperature sensor holder 100 has the opening portion 25 for taking out the harness 220 of the temperature sensor 200 from above the adjacently arranged insulator 320.

According to the temperature sensor holder 100, the harness 220 of the temperature sensor 200 stored in the storage groove 21 is located on the coil end portion 32 of the adjacently arranged coil 330. Thus, by forming the opening portion 25 in the temperature sensor holder 100 so that the harness 220 is taken out from above the adjacently arranged insulator 320, a length of the harness 220 can be made shorter, and the wiring can be simplified.

Although the embodiments of the present invention have been described in the above, the above-mentioned embodiments merely illustrate a part of application examples of the present invention, and the technical scope of the present invention is not intended to be limited to the specific configurations in the above-mentioned embodiments.

In the aforementioned description, for example, the sensor pressing portion 22 has the cantilever structure, but it may be a both-end support structure held by both ends of the storage groove 21. As described above, even if the sensor pressing portion 22 has the both-end support structure, the temperature sensor 200 can be pressed to the coil end portion 332.

Moreover, the stator is not limited to the aforementioned split-core type stator but may be an integral core-type stator. Furthermore, FIG. 1 illustrates a state where only one unit of the temperature sensor holder 100 into which the temperature sensor 200 is inserted is attached to the stator, but a plurality of the temperature sensor holders 100 may be attached to the stator.

The aforementioned embodiment can be combined as appropriate.

This application claims priority based on Japanese Patent Application No. 2015-105571 filed with the Japan Patent Office on May 25, 2015, the entire contents of which are incorporated into this specification.

The invention claimed is:

1. A temperature sensor holder adapted to mount a temperature sensor adapted to measure a temperature of a coil of a stator comprising a stator core, the coil wound around the stator core, and an insulator providing insulation between the stator core and the coil, the temperature sensor holder comprising:
    a holder fixing portion structured to fix the temperature sensor to the insulator; and
    a sensor holding portion integrated with the holder fixing portion and structured to hold the temperature sensor on a coil end portion of the coil, the sensor holding portion including
        a storage groove adapted to store the temperature sensor, the storage groove including, at a groove bottom of the storage groove, a sensor pressing portion adapted to press the temperature sensor to the coil end portion from a direction of a rotation axis of a rotor of the stator.

2. The temperature sensor holder according to claim 1, wherein
    the sensor pressing portion is cantilevered so as to extend from one end to another end of the storage groove and is structured to press the temperature sensor on a side of the another end in the storage groove.

3. The temperature sensor holder according to claim 2, wherein
    the sensor pressing portion includes a projecting portion protruding toward the temperature sensor at a position on the side of the another end in the storage groove.

4. The temperature sensor holder according to claim 3, wherein
    the sensor holding portion includes an expanding portion protruding from the holder fixing portion in a stator circumferential direction.

5. The temperature sensor holder according to claim 4, wherein
    the expanding portion includes an escape portion disposed to avoid interference between the insulator and an adjacently arranged insulator.

6. The temperature sensor holder according to claim 5, wherein
    the expanding portion includes an opening portion adapted to permit removal of a harness of the temperature sensor from above the adjacently arranged insulator.

* * * * *